(12) United States Patent
Wilks

(10) Patent No.: US 12,631,419 B2
(45) Date of Patent: May 19, 2026

(54) COMBINED SURVEILLANCE CAMERA AND SCOPE FIREARM APPARATUS

(71) Applicant: Timothy B. Wilks, Stanley, WI (US)

(72) Inventor: Timothy B. Wilks, Stanley, WI (US)

(73) Assignees: Kirby D. Wilks, Milwaukee, WI (US); FiFi K. Wilks, Milwaukee, WI (US); Cynthia R. Simpson, Milwaukee, WI (US); Devon D. Wilks, Milwaukee, WI (US)

( * ) Notice: Subject to any disclaimer, the term of this patent is extended or adjusted under 35 U.S.C. 154(b) by 127 days.

(21) Appl. No.: 18/445,114

(22) Filed: Apr. 17, 2023

(65) Prior Publication Data

US 2024/0003650 A1     Jan. 4, 2024

Related U.S. Application Data

(60) Provisional application No. 63/473,844, filed on Jun. 29, 2022.

(51) Int. Cl.

| | |
|---|---|
| *F41A 27/08* | (2006.01) |
| *F16M 13/02* | (2006.01) |
| *G03B 17/56* | (2021.01) |
| *G03B 29/00* | (2021.01) |

(52) U.S. Cl.
CPC ........... *F41A 27/08* (2013.01); *F16M 13/027* (2013.01); *G03B 17/561* (2013.01); *G03B 29/00* (2013.01)

(58) Field of Classification Search
CPC ..... F41A 27/08; F16M 13/027; G03B 17/561; G03B 29/00
USPC ....................................................... 42/69.01
See application file for complete search history.

(56) References Cited

U.S. PATENT DOCUMENTS

| | | | |
|---|---|---|---|
| 2012/0266746 A1* | 10/2012 | Hodge | F41A 27/28 89/41.05 |
| 2024/0003650 A1* | 1/2024 | Wilks | G03B 17/561 |

FOREIGN PATENT DOCUMENTS

| | | | |
|---|---|---|---|
| WO | WO-2018198108 A1 * | 11/2018 | F16M 11/10 |

OTHER PUBLICATIONS

Sublethal Remote Gun product page (www.sublethal.co.za) (Year: 2019).*

* cited by examiner

*Primary Examiner* — Samir Abdosh

(57)     ABSTRACT

The embodiment of this invention is a combined zoom surveillance camera and zoom scope firearm interconnected on a bipole shaft apparatus, including: A top end ball-bearing which is partially encompassed by one end of a peg brace connected to a rotatable overhead pulley rim; A off-middle tripod of three circular level pivotal surveillance cameras; A off-middle ball-bearing which is partially encompassed by a bearing ring affixed with three hook shaped rods for attachably hanging the bipole shaft apparatus from a ceiling; and, a bottom end base of at least one to three scope firearms for targeting a threatening mass human shooter. The entire bipole shaft apparatus of said top end ball-bearing, off-middle three cameras, off-middle ball-bearing, and bottom end one to three firearms may be simultaneously tilt shifted and circularly rotated on a downward angle whenever a local or distal computer terminal operator activate the necessary electrical wire or wireless torque energy conveyed to the bipole shaft's top end ball-bearing's said connected peg brace and pulley rim band via an electric motor and generator box.

20 Claims, 1 Drawing Sheet

1

FIG. 1
FIG. 4
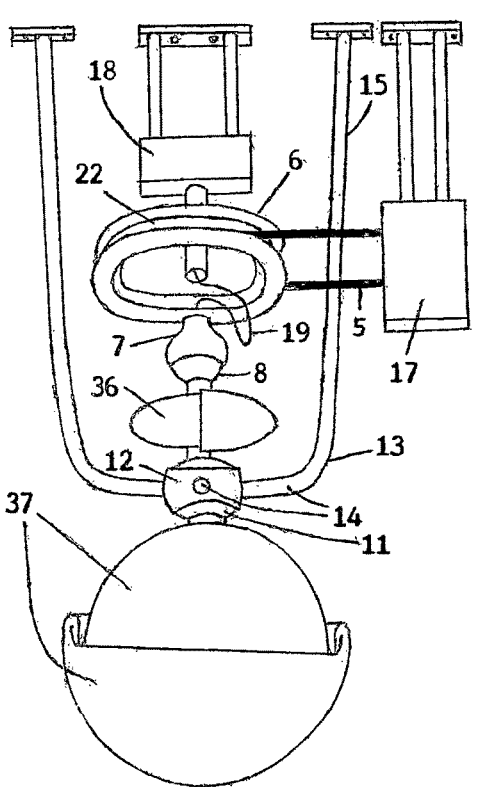
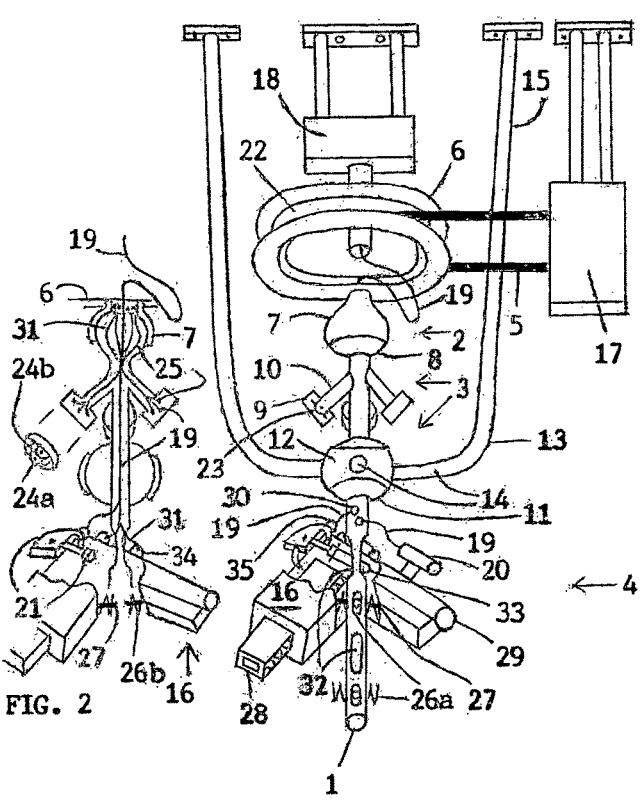
FIG. 2
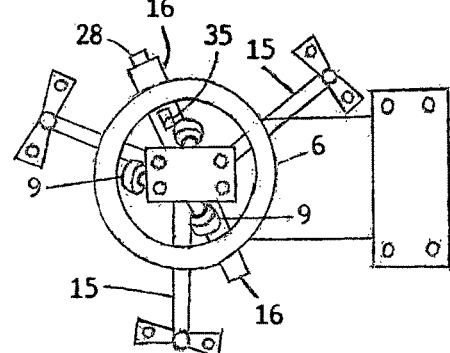
FIG. 3

COMBINED SURVEILLANCE CAMERA AND SCOPE FIREARM APPARATUS

STATEMENT OF APPLICABLE REFERENCES & PARTIES

(1) Cross Reference to Related Applications (Non-applicable).

(2) Statement of Federally Sponsored Research Development (Non-applicable).

(3) Names of Joint Research Agreement Parties (Non-applicable).

(4) Reference to Sequence Listing (Non-applicable).

BACKGROUND OF THE INVENTION

Field of the Invention

This present invention relates to camera and gun controlled pre-emptive and active human killing deference and prevention.

Description of the Prior Art

Typically, there are numerous general methods employed for camera and gun controlled crime deference and prevention.

Camera Crime Control Methods:

Most of the numerous surveillance camera methods employed for crime deterrence and prevention involve aerial surveillance, which is generally accomplished by installing one or more high resolution zoom focusable cameras on either an outdoor landscape or street aerial pole or cable of a public or private event; or, on either the exterior roof wall or interior ceiling or wall of public or private buildings, houses, or events. Such surveillance cameras are generally aimed and focused at targeted areas either throughout the inside or outside of a building or house to deter or detect and photograph the image of an active or suspicious crime suspect for further law enforcement investigative, arrest, and prosecutorial purposes.

The most disadvantageous drawback for the surveillance camera method of crime deterrence and prevention, is the more probable reality that a potential suspect may not only fail to be deterred by the cameras apparent identification of them for law enforcement, but therefore may still proceed to carry out their intended crime against either the building or house occupants or property and at a further or later time commit additional crimes before law enforcement conduct an investigation, identification, and apprehension.

Gun Crime Control Methods:

Most legal gun control crime deterrence and prevention methods involves State or Federal acts of crime deterrence and prevention legislation of laws or ordinances prohibiting or restricting the civilian right to bear or use firearms. Including: Acts prohibiting firearm possession or use by convicted or released criminals; Acts limiting the conditions and age under which a minor may process or use a firearm;

Acts requiring civilians to register and obtain a license for their intended ownership and use of a firearm before purchase and possession; Acts requiring firearm sellers to conduct a background check on potential gun buyers to determine if they have a criminal or mental illness history that invokes a non-purchase restriction prohibiting their sell of any firearm; Acts authorizing full authority by law enforcement officials and Limited authority by law abiding civilians who possess a firearm to lawfully use it to stop the act or threat of harm by a criminal or dangerous person against then or another law abiding person; Acts limiting the rapid excessive firing and/or bullet capacity and manufacture or sell of high assault firearms; Acts prohibiting the concealment of a law fully or unlawfully possessed firearm; and, Acts requiring a verification delayed firearm sell purchase possession waiting period pending a history background check.

The most disadvantageous drawback for the said many gun crime control method acts of crime deterrence and prevention, is the more probable reality that a potential group or individual terrorist or mentally ill person whether lawfully or unlawfully in possession of a firearm or bomb device may in disregard of the gun control laws recklessly invade a public or private building, house, or event of law abiding people and use it to kill one or more of them before or without ever timely being confronted, demised, or apprehended by any of the law enforcement measures intended by the legislated gun control acts to protect the people killed otherwise.

SUMMARY OF THE INVENTION

The instant invention is a Bipole Axle Shaft Apparatus for interconnecting combined sub-apparatuses of a surveillance camera and telescoped firearm into a single integrated Unit controlled by a computer terminal operator. As shown below, it provides many advantageous objectives over old current conventional and contemporary controlled individual: surveillance cameras and individual telescoped firearms.

One novel advantageous objective of this new invention is the creation of a Bipole axle interconnected combined zoom surveillance camera and zoom telescoped firearm apparatus that may be installed on either an aerial pole or cable at a public or private outdoor event; or, on either the exterior roof or wall or interior ceiling or wall of a public or private building, house, or event.

Another advantageous objective of this new invention, is the creation of a bipole axle interconnected combined surveillance camera and telescoped firearm apparatus that my be electrically swivelled by a wire or wireless interconnected computer terminal operator at a local or remote distal location to track, aim, zoom, target and wound or kill any focused body part of a criminal who pose a individual or mass innocent victim shooting threat or killing, whether accosting or holding a victim.

A further advantageous objective of this new invention is the creation of a bipole axle interconnected combined camera and firearm apparatus of which the firearm may be electrically discharged by a wire and/or wireless interconnected computer terminal distally operated only by a U.S. or State congressional legislated public or military law-enforcement department or sanctioned security firm, eliminating the need of a law-enforcement official or lawful firearm bearing citizen to risk the danger of directly confronting a gun or bomb carrying terrorist or mentally ill criminal before they're disarmed or demised. Thus, creating and providing a new form of general policing for all necessary indoor and outdoor places such as: General businesses, Schools, Churches, Malls, Supermarkets, Conventions, Concerts, Festivals, Parades, Streets, Parks, Courts, News-stations, Public safety facilities, Government buildings, Military bases, Sports or Social or Political events, or even citizen and official's homes or offices. All to reduce and deter further gun and even knife related crimes.

Yet a still further advantageous objective of this new invention is the creation of a bipole axle interconnected combined camera and firearm apparatus that may be concealed in a translucent color tinted encasement shield to obscure a criminal's observation of the said camera and firearm's aim or view through the shield before the firearm shield is shattered by a interior discharged bullet projectile to eliminate an active or suspicious individual or mass shooter threat.

A furthermore advantageous objective of the new invention is the creation of a bipole axle interconnected combined surveillance camera and firearm apparatus that may be individually or multiply installed in numerous areas, rooms, or walkways of either a indoor building, house, or outdoor event and coordinated by a computer terminal operator to electrically swivel, tilt, shift, or stop the surveillance camera and telescoped firearm simultaneously towards various different or same angles or focal points.

BRIEF DESCRIPTION OF THE DRAWINGS

The instant new invention of a vertical hollow Bipole Axle Shaft Apparatus and interconnected combined camera and firearm sub-apparatus is fully shown with alternate views in the annexed drawings and described in the following figures and below detailed description.

FIG. 1 is a side view showing the new instant main Bipole Axle Shaft Apparatus affixed to a ceiling with it's interconnected surveillance camera and telescoped firearm sub-apparatus, including a cut-out plane view showing the firearm's interior mechanical apparatus's functional mechanism arrangements.

FIG. 2 is a side sectional cut-out plane view of the Bipole axle shaft showing both: the interior plane electrical wire connections of the firearm and camera to an electric wire generator box correspondingly referred to in FIG. 1; and, the interior plane's pulley string connections of the firearm and camera to a peg bearing directly linked to a pulley rim via the Bipole axle shaft correspondingly referred to in FIG. 1.

FIG. 3 is a topside overview showing the Bipole axle shaft apparatus of the camera and firearm affixed to a ceiling with it's electric circuit boxes affixed adjacently.

FIG. 4 is a side view of the bipole axle shaft apparatus with both the surveillance camera and telescoped firearm each separately encased within separate shields.

DETAILED DESCRIPTION OF THE INVENTION

The instant new vertical hollow Bipole Axle Shaft Apparatus embodiment as shown in the annexed drawing FIGS. 1, 2, 3, & 4 consist collectively of each:
- (A). a main vertical hollow bipole axle shaft Apparatus (1) including a top end section (2), a mid axial axis section (3), and a bottom end section (4).
- (B). a pulley band (5) for connectably banding a metal ringed pulley rim (6) which is affixably supported by an underlying pear-shaped metal peg mount bearing (7). The metal peg mount bearing (7) itself is affixably supported by a hollow metal mount ball tip (8) which is affixably attached at the said top end section (2)'s axis surface of the main bipole axle shaft apparatus (1);
- (C). a sub-apparatus tripod of three case covered surveillance cameras (9) which are affixably attached to each of three metal stem rods (10) which are affixably attached in equally spaced parallel holes around the upper mid axial axis section (3)'s axis surface of the said bipole axle shaft apparatus (1);
- (D). a hollow metal base ball junction (11) is affixably attached around the lower mid axial axis section (3)'s axis surface of the said bipole axle shaft apparatus (1). The said metal base ball junction (11)'s surface is affixably encircled by a metal tripod base ring bearing (12) also encircling it around the lower mid axial axis section (3) of the said bipole axle shaft (1). Also embedded around in the surface of said metal tripod base ring bearing (12) are three equally spaced parallel holes in each of which is affixed a curved short length end portion (13) of three metal hook shaped rods (14) of which each has a opposite straight long length end portion (15) affixable to a ceiling surface.
- (E). a sub-apparatus of at least one up to three telescoped firearms (16) is affixably attached around the said bottom end section (4)'s axis surface of the said bipole axle shaft (1).
- (F). An electric motor box (17) for conveying said pulley band (5) of said ringed pulley rim (6). An electric generator box (18) to supply wire and fiber cable cords (19) to said cameras (9), firearms (16), telescope (20). And, a main computer terminal base for receiving, processing, and transmitting local and remote instructional data, to activate the camera and firearm firing pin (21).

For more detailed clarity on the new invention's embodiment, the following more descriptive outlines are given:
- (A). The main hollow bipole axle shaft apparatus's (1) top end section (2)'s axis surface is circularly fused with said hollow metal mount ball tip (8). The metal mount ball tip (8) itself is sufficiently partly encompassed from it's topside down within a sufficiently loose said metal peg mount bearing (7). And, the metal peg mount bearing (7) itself is attached to an overlying said hollow centered metal ringed pulley rim (6) having an exterior surfaced circular groove (22) encircled with said pulley band (5);
- (B). Also, the main hollow bipole axle shaft apparatus's (1) upper mid axial axis section (3)'s axis surface is circularly fused with one end each of three equally spaced said metal stem rods (10) of which the opposite end of each stem rod (10) has a paired pivot hinge pin set means (23) for connectably affixing to one crosswise paired pivot hinge holes (24a) bored through two inversed edge points on the back surface of each said three case covered cameras (9);
- (C). Also, Another crosswise pair of pivot hinge holes (24b) are bored also through two inversed bent edges on the back surface of each said three covered cameras (9). Affixed to each camera cover's second crosswise paired hinge holes (24b) are the paired ends of two tilt shiftable pulley strings (25) the opposite ends of which extend interiorly through each said stem rod (10) and axle shaft (1) and attachably end at the interior neck of said peg mount bearing (7) which is attached to said pulley rim (6). So that, when the pulley rim rotate the said peg mount bearing left or right, each camera cover's paired hinge hole attached paired pulley strings tilt each camera up or down simultaneous to the pulley rim;

(D). Also, the main hollow bipole axle shaft apparatus's (1) lower mid axial axis section (3)'s axis surface is circularly fused with said hollow metal base ball junction (11) which is sufficiently partly equatorially encircled within a sufficiently loose said metal tripod base ring bearing (12) and around the surface of said bearing (12) are said three equally spaced holes in which each is fused with the curved short length end portion (13) of said three hook shaped rods (14) of which the opposite said straight long length end portion (15) is attachably affixed to a ceiling or other foundation surface for installation;

(E). Also, the main hollow bipole axle shaft apparatus's (1) bottom end section (4)'s axis surface is circularly fused with up to three but at least one set of two paired round and two paired oblong equally spaced crosswised metal pivot springs (26*a* & *b*) which are each insertably set on the corresponding free ends of four stabilizer pins (27) the opposite ends of which are each fused to each of four interior hollow void spaced surfaces in the bend between the cartridge chamber (28) and barrel (29) of at least one said firearm apparatus (16). Both the said corresponding sets of four pivot springs (26) and four stabilizer pins (27) provide the said firearm (16) with tolerable fixturing, recoil repositioning, and tilt shifting capabilities for efficient projectile discharge operation.

For functional operation of the said bipole axle shaft apparatus's (1) mechanical and electrical components and mechanisms, the following descriptive outlines are given:

(A). The main hollow bipole axle shaft apparatus's (1) bottom end section (4)'s axis surface is provided with both: a plurality of off-set minute circular port holes (30) for interior circuit wire and fiber cable cords (19) exterior exit to terminal telescope (20) & firearm (16) functional mechanisms; and, at least one up to three paired sets of two parallel adjacent minute oblong slot openings (32) to facilitate both the clear passage of a discharged bullet projectile (33) and the passage of a said paired set of the same said tilt shiftable pulley strings (31) which are affixed at one end to a paired set of two tilt shiftable loops (34) on the hollow bend edge of said at least one to three firearms (16) and the opposite two ends of the pulley strings (31) extends interiorly through said axle shaft (1) and attachably end at the interior neck of said peg mount bearing (7) which is attached to said pulley rim (6). So that, when the pulley rim swivel the said peg mount bearing left or right, each said at least one to three firearm's paired loop attached pulley strings ends will tilt the said firearm up or down simultaneous to the pulley rims swivel.

(B). The said electric motor box apparatus (17) is provided with terminal energy circuitry of electrical wire (19) connected to rotor disc, micro chip, and sensory and motion detecting modular relay mechanisms to receive and transmit macro electromotive energy activation data from a local or remote distal computer data processing terminal system;

(C). The said electric generator box apparatus (18) is provided with terminal energy circuitry of electrical wire and optic fiber cable cords (19) connected to micro chip, and sensory and motion detecting modular relay mechanisms to generate and transmit wire and/or wireless electrical energy data to activate and control a mechanical linked said surveillance camera, telescoped firearm, and motor box mechanisms via said local or remote distal computer data processing terminal system; and, (D). Interiorly facilitating and connecting the sets of said electric wire and optic fiber cable cords (19), along with said sets of pulley strings (25) & (31), is the interior hollow void of the said vertical hollow bipole axle shaft: (1) axis through which the said electric wires, optic fibers, and pulley strings pass to terminate in said surveillance camera and telescoped firearm apparatus. An insulated direct electric wire current terminal contact point (35) at the bend of a said firearm (16)'s firing pin lever (21) is induced with direct current to disengage and release the firing pin lever to discharge a bullet projectile at an image transmitted and targeted through the said electric wire and optic fiber cords (19) of said surveillance camera and telescoped firearm apparatus (9) & (16).

(E). Two separate two piece section translucent shield (36) for a surveillance camera and translucent shield (37) for a telescoped firearm are provided: to sufficiently diminished the view of the camera and firearm's aim from the view of an exterior shield intended targeted observer; and, to sufficiently enable the discharged bullet of the firearm to shatter the firearm shield and hit said target.

I claim:

1. A vertical hollowed metal bipole axle shaft apparatus having each: a top end section, a mid axial axis section, and a bottom end section for interconnecting and combining a surveillance camera and a telescoped firearm, including functional parts of the camera and firearm into a single integrated unit:

[a] Whereon, the said vertical bipole axle shaft's top end section is an integrally fused axis hollowed solid metal mount ball tip—which mount ball tip is two-thirds partly encompassed within a hollowed pear-shaped metal peg mount bearing—which peg mount bearing has a broad opened mouth end where the said opened mouth end retentionably encircle the said two-third portion of said mount ball tip—and which peg mount bearing has a opposite narrow closed tip end where said closed tip end is affixed to an underside surface point of a metal ringed pulley rim—around which is a conveyable tractionable pulley band;

[b] Whereon, the said vertical bipole axle shaft's upper axial axis section is integrally fused with one end each of three equally spaced downward angled hollow metal tripod stem rods—each opposite end of said tripod stem rods has a paired pivot hinge peg—each hinge peg is attachably fixable to a paired hinge hole link on each covering of three surveillance cameras for tilt shifting;

[c] Whereon, the said vertical bipole axle shaft's lower axial axis section is an integrally fused hollowed axis solid metal base ball junction—where the said metal base ball is both one-third partly equatorially encircled and retentionably suspended by a solid metal tripod base ring bearing positioned between the said metal base ball's opposite polar surface sections—and where the surface of the said metal tripod base ring bearing has three equally spaced circular slots—each slot in which are integrally affixed one each of three elongate hook shaped rods of which each elongate hook rod has both a curved segment end that is fused to one of said three slots in said metal tripod base ring bearing and a straight segment end that extends vertically upwards for foundational ceiling surface attachability;

[d] Whereon, the said vertical bipole axle shaft's bottom end section's axis surface has at least two spaced crisscrossed separated paired bored holes—each paired hole is fused with two spaced crisscrossed separated paired pivot spring sets—each paired pivot spring's opposite ends are inserted on each corresponding end of two spaced crisscrossed separated paired stabilizer pin sets, the opposite ends of which are fused in the interior bend of at least one up to three telescoped firearms for downward angle tilt shifting—each pin is fused at one of four opposite interior surfaces across a partly hollow spaced void in said bend which merge the cartridge chamber and barrel of said telescoped firearm—whereat said sets of affixed firearm pins function as a tilt tracking means; and,

[e] Whereon, the axle shaft apparatus said functional parts of the said surveillance camera and telescoped firearm are interconnected to and controlled with wire and wireless energy from and to a module integrated computer data processing unit to generate and transmit the energy from and to both macro and micro local and remote distal sensory and motion reactive modular generator and motor circuit boxes—whereby, said camera and firearm's mechanical apparatus parts can be functioned.

2. The apparatus of claim 1, wherein, the said hollow bipole axle shaft apparatus's said three metal stem rod hinged surveillance camera coverings are metal case coverings which are formed with both; two crosswise pairs of four pivot hinge holes bored through four inversed surface bent edges on the back surface of each said three camera case coverings, for both:

[a] Hinging one pair of each camera covering's inversed back hinge holes with the insertable said pivot hinge peg set at the opposite end of each said three fused stem rods; and,

[b] Hinging the other one pair of each camera covering's inversed back hinge holes with each of the attachable paired ends of two tilt shiftable pulley strings the opposite ends of which extends interiorly through each said hollow stem rod and axle shaft and attachably end at the interior neck of said peg mount bearing which is attached to said pulley rim—So that, when the said pulley rim is swivelled left or right, the said peg mount bearing will swivel with it and cause each camera cover's paired hinge hole attached pulley strings to tilt each camera up or down simultaneous to the pulley rim's left or right swivel.

3. The apparatus of claim 1, wherein, the said hollow bipole axle shaft apparatus's bottom end section's axis surface is provided with both:

[a] A plurality of off-set minute circular port holes for the exterior exit of interior circuit wire and fiber cable cords to terminate at the functional mechanisms of said telescope and firearm; and,

[b] At least one up to three paired sets of two parallel adjacent minute oblong slot openings to facilitate both: the clear passage of a discharged bullet projectile; and, the clear passage of one parallel adjacent paired set of two separate slot crossed tilt shiftable pulley strings which are affixed at one paired ends to a separated paired set of two tilt shiftable hinge loops on the said hollow bend edge of said at least one to three firearms and the opposite two ends of either paired said pulley strings extends interiorly through said axle shaft and attachably end at the interior neck of said peg mount bearing which is attached to said pulley rim—So that, when the said pulley rim is swivelled left or right, the said peg mount bearing will swivel with it and cause each said one up to three firearm's said hinge loop attached pulley string paired ends to tilt each said one or up to three firearms up or down simultaneous to the pulley rim's left or right swivel.

4. The apparatus of claim 1, wherein, the said vertical bipole axle shaft's bottom end section's axis surface has at least one greek cross intersecting horizontal hollow void interior space plane of two separated crisscrossed paired holes bored across through said axle's bottom end section's axis surface for linking attachments to support the suspension and stabilized positioning of a tilt shiftable firearm—

[a] One set of the said horizontal crisscrossing plane paired holes are, superimposed and fused with: One uniformed matching opposite sided widthwise void space separated hole pair of two exterior axis surfaced horizontal width affixed round coiled metal pivot springs—each width positioned pivot spring has both a protrudable coiled end surface edge and also a opposite affixed coiled end surface edge—each width positioned pivot spring's affixed coiled end surface edge is separately fused in opposite axis surface sided spring attachment widthwise hole edges bored within the said axle's bottom end section—and;

[b] The other set of the said horizontal crisscrossing plane paired holes are, superimposed and fused with: One other uniformed matching opposite sided lengthwise void space separated hole pair of two exterior axis surfaced horizontal length affixed oblong coiled metal pivot springs—each length positioned pivot spring has both a protrudable coiled end surface edge and also a opposite affixed coiled end surface edge—each length positioned pivot spring's affixed coiled end surface edge is separately fused in opposite axis surface sided spring attachment lengthwise hole edges bored across said axle's bottom end section.

5. The apparatus of claim 1, wherein, the said vertical bipole axle shaft's bottom end section's said at least one affixed firearm has an entry pocket accessible hollow void depth in the interior surface of the said bend between the said cartridge chamber and said barrel of the firearm—where interiorly at separate opposite side widthwise paired parallel surface points across the said hollow spaced void of said bend are separate fused end paired widthwise stabilizer pins, where each widthwise stabilizer pin is inserted with a separate widthwise said pair of pivot springs which are fusedly affixed at the opposite end to said axle's bottom end section's axis surface—and where interiorly at separate opposite side lengthwise paired parallel surface points across the said hollow spaced void of said bend are also separate fused end paired lengthwise stabilizer pins, where each lengthwise stabilizer pin is also inserted with a separate lengthwise said pair of pivot springs which are also fusedly affixed at the opposite end to said axle's bottom end section's axis surface.

6. The apparatus of claim 5, wherein, the said vertical axle shaft's bottom end section's said axis surface insertion attachments of the said two paired crisscrossed widthwised and lengthwised pivot springs are insertably linked onto the corresponding said two paired crisscrossed widthwised and lengthwised stabilizer pins within the said hollow spaced void interior of the said bend between the cartridge chamber and barrel of said firearm—Whereby, the said insertion attachments allow the crisscrossed paired links of the said pivot springs onto the said stabilizer pins to function simultaneously as one crisscrossed supporting pivot and tilt shifting unit, and, enables the controlled stable position of the firearm to both:—minimize tolerable uncontrolled nonresistant pivot tilt shifting of the firearm—and maximize automatic repositioning of the firearm when fired and kicked back due to recoil reactions.

7. The apparatus of claim 1, wherein, the said vertical hollowed metal bipole axle shaft's entire central axis is inserted with a set of electrical wire and optic fiber bearing cable cords that are extended from said electric generator box and through each of the said top end, mid axis, and bottom end sections of the axle's apparatus affixed:—ringed pulley rim, peg mount bearing, mount bearing, mount ball tip, and metal base ball junction of said supportive metal tripod base ring bearing—along the path of which said wire and fiber cable cords terminate at said surveillance camera and telescoped firearm apparatuses.

8. The apparatus of claim 1, wherein, the said vertical hollowed bipole axle shaft apparatus's said electric generator box is electrically linked to said electric motor box for the dual merged circuit energy source of the said axle axis surface inserted and terminal ending circuit wire and fiber optic cable cords—Whereby, said generator and/or motor can generate and transmit both coordinate electromotive force energy and electromagnetic wireless energy data from and to either a local or remote distal computer terminal—Whereby, said computer could be operated to activate and control either one or all of each said: pulley rim's tractable pulley band's rotational movement function mechanisms; tripod surveillance camera's lens image-focus or turn and tilt movement function mechanisms;—and firearm's telescope image-focus, turn and tilt, and trigger firing movement function mechanisms.

9. The apparatus of claim 1, wherein, the entire bipole axle shaft apparatus's said:—pulley rim and pulley band;—peg mount bearing;—metal mount ball tip;—tripod affixed three surveillance cameras;—metal base ball junction;—and at least one up to three affixed telescoped firearms, are all simultaneously swivable 180° incrementally: slow or swiftly fast left or right—Where, by simultaneously generating electric and/or wireless energy forces from the electric wire and/or wireless transmitter components in the said electric generator and motor boxes, the electromotive force energy activated from the electric motor will mechanically convey the said pulley band with tractional motion mobility to tractably rotate it's banded pulley rim and underside said peg mount bearing,—which in turn, by the said peg mount bearing being positioned retentionably loose upon the said mount ball tip, the said peg mount bearing will be drawn to recyclably rotate on a swivel and draw along the entire pivotable underlying bipole axle with it's affixed said:—mount ball tip, tripod rod cameras, metal base ball junction, and at least one firearm—all being foundationally supported at said metal base ball junction by said tripod base ring bearing.

10. The apparatus of claim 1, wherein, the said bipole axle shaft apparatus's said:—mid axial axis section's metal tripod rod's said pivot peg and hole hinged three cameras, and, bottom end section's said pivot spring and pin suspended one or more firearms are each simultaneously tiltable up or down by pairs of two pulley strings attached each at one paired ends to each separate camera and firearm's tiltable surface segments and attached at each opposite paired ends to discrete segment points at the interior neck of said peg mount bearing, which is attached to said overlying pulley rim—So that, when the said pulley rim is swivelled left or right, the said peg mount bearing will swivel with it and cause each camera and firearm affixed pulley string paired ends to tilt each camera and firearm up or down simultaneous to the pulley rim's left or right swivel.

11. The apparatus of claim 8 wherein, the said bipole axle shaft apparatus utilizes an assembly of computer connected and control accessible minute electrical micro chip, optic-fiber, and rotor disc material devices which are employed from sufficient sized coordinate electronic modules inserted in the voids of each said electrical circuit box, tripod cameras, and firearm bodies for simultaneously sensing a surveillance camera and telescoped firearm's mechanical lens and movement mechanism's simultaneous visual imagery and motion reaction position—and for generating isolated wire and wireless electrical energy pulses to induce swivel shifting, tilt shifting, and balance-counterbalance control for optimal apparatus camera and firearm operation functioning.

12. The apparatus of claim 11, wherein, the said axle shaft apparatus's discrete individual tripod surveillance cameras are connected to optic fiber bearing cables having access to sufficient camera lens that are capable both:—of providing clear high resolution optical visual observation imagery from objects and light—and of reproducing clear high resolution optical visual film imagery from objects and light onto a discrete individual film reproduction photo material and onto a computer projection image screen.

13. The apparatus of claim 11, wherein, the said bipole axle shaft apparatus's firearm affixed said telescope is connected with a fiber optic cable which provide access to sufficient telescope lens that are capable of providing clear high resolution optical visual observation imagery from objects and light.

14. The apparatus of claim 11, wherein, the said bipole axle shaft apparatus's operational attached sub-apparatus firearm has at least each:—one cartridge which bears bullet projectiles;—an electric contact trigger and cartridge release mechanism;—a bullet primer striking electric pulse trigger firing pin;—and a perpetual electric firing pulse circuit source—Whereby, by a said computer linked electric generator of wire fed energy terminals, said mechanisms could be activated and controlled to discharge said bullets by using electric wire and wireless energy induction as a trigger to emit an electric firing energy pulse from an electric wire for recoil of a firing pin to strike a cartridge released bullet's primer contact for discharge from a firearm.

15. The apparatus of claim 1, wherein, the said vertical bipole axle shaft's upper axial axis section is affixed with a two section translucent shield case for concealment of a set of said tripod rod of cameras

[a] Together, the two sections of the shield are linked as two parallel slide couplable and decouplable half lengthwise section sized hollow void elliptical receptacles One half elliptical section is broadly larger in it's half lengthwise sectioned elliptical size than the other less broad corresponding receptacle's half lengthwise sectioned elliptical size;

[b] Both the broadly larger and the less broad half lengthwise elliptical receptacle sections have two seperated spaced polar axis surface formed polar hole gaps for snapping onto said axle's axis surface above and below the said three tripod rod cameras;

[c] When both half sectioned elliptical receptacles are affixed on said axle's upper mid axial axis surface, the less broad half lengthwise elliptical receptacle section's polar hole gaps are snapped on the axle's surface and loosely affixed on the inside of the snapped on and loosely affixed broadly larger half lengthwise elliptical receptacle section above and below the said three tripod rod cameras; and

[d] Because the two snap on polar surface formed hole gaps on the said polar surfaces of both the said half elliptical receptacle sections are fit affixed loosely around the said axle's axis surface, the loosely fitted outside broadly larger half elliptical receptacle section could be manually swivelled to be either coupled in a parallel position behind the less broad inside half elliptical receptacle to form a doubled parallel half elliptical receptacle shape or de-coupled to form a full elliptical receptacle shield shape—Whereby, by swivel coupling both half elliptical receptacles, the half coupling will deshield the interior three tripod rod cameras for maintenance accessibility; and, by swivel de-coupling both half elliptical receptacles, the full elliptical receptacle shield's dense translucence will conceal the camera's exact focus angle.

16. The apparatus of claim 1, wherein, the said vertical bipole axle shaft's bottom end section's axis surface is affixed with a two section translucent shield case for firearm concealment:

[a] Together, the two sections of the shield are linked as two matching slide overlappable couplable bowl shaped half spherical receptacle sections—Each half spherical receptacle section is linkably set in a half spherical equatorial opposite polar position;

[b] The one upper half spherical receptacle section has a folded out and up grooved rim ridge, which is molded half way around it's half spherical equatorial edge The other lower half spherical receptacle section has a folded in and down grooved rim ridge, which is molded half way around it's half spherical equatorial edge The opposite folded grooves allow the spheres to be cufflinked;

[c] The one only stationary affixed upper half spherical receptacle section has a single upper polar axis surface formed constrictionable axis hole, which when initially affixed to said axle's bottom end section's surface is done by sliding the constriction hole up around said axle's bottom end section's surface and positioning it right below said metal base ball junction and metal base ring bearing;

[d] The other opposite non-fixed non-stationary lower half spherical receptacle section has only attachable and detachable folded groove rim means to be slid or cufflinked onto the said upper half spherical receptacle section's folded groove rim ridge which extends only half way around it's equatorial edge to facilitate corresponding slide or cuff linking—Whereby, by slide or cuff linking, the shield could be opened for firearm maintenance accessibility; and, by slide or recuffing, the shield could be closed to conceal the firearm and it's focused aim angle.

17. The apparatus of claim 1, wherein, the said bipole axle shaft's upper mid axial axis section's said metal tripod base ring bearing has three affixed hook shaped curved end and straight end rods:—where the said three hook's curved ends are each fused to one of three equally spaced slots which are bored around the surface of said metal tripod base ring bearing;—and where the said three hook's straight ends are each extended vertically upwards spaciously past and encompassly beyond the interior said apparatus for ceiling foundational surface attachability—Whereby, with assembly and installation, the said metal tripod base ring bearing and said tripod rod attachments support the entire said vertical bipole axle shaft apparatus's component parts.

18. The apparatus of claim 15, wherein, the said bipole axle shaft's upper mid axial axis section's translucent shield for concealing said tripod rod of three cameras is sufficiently tenuous to: allow optimal interior camera lens observation of objects seen outside the said closed shield, and diminish an observation of the camera by observers outside the shield when closed.

19. The apparatus of claim 16, wherein, the said bipole axle shaft's bottom end section's translucent shield for concealing said at least one or up to three firearms is sufficiently tenuous to: allow a firearm's telescope optimal interior lens observation of objects seen outside the said closed shield, and diminish an observation of the firearm by observers outside the shield when closed.

20. The apparatus of claim 16, wherein, the said bipole axle shaft's bottom end secs tion's translucent shield for concealing said at least one or up to three firearms is made of a permeable translucent material which is sufficiently breakable to be penetrated and/or shattered by a firearm discharged bullet projectile from within the shield.

* * * * *